July 3, 1956 R. F. BROUSSARD 2,752,924
COIN HANDLING APPARATUS
Original Filed Jan. 14, 1948 6 Sheets-Sheet 1

INVENTOR.
Robert F. Broussard
BY
Attorneys

July 3, 1956  R. F. BROUSSARD  2,752,924
COIN HANDLING APPARATUS
Original Filed Jan. 14, 1948  6 Sheets-Sheet 2

INVENTOR.
Robert F. Broussard
BY
Banning & Banning
Attorneys

July 3, 1956 — R. F. BROUSSARD — 2,752,924
COIN HANDLING APPARATUS
Original Filed Jan 14, 1948 — 6 Sheets-Sheet 3

INVENTOR.
Robert F. Broussard
BY
Banning & Banning
Attorneys

July 3, 1956    R. F. BROUSSARD    2,752,924
COIN HANDLING APPARATUS

Original Filed Jan. 14, 1948    6 Sheets—Sheet 5

INVENTOR.
Robert F. Broussard
BY Banning & Banning
Attorneys

INVENTOR.
Robert F. Broussard
BY
Banning & Banning
Attorneys

United States Patent Office 2,752,924
Patented July 3, 1956

2,752,924

COIN HANDLING APPARATUS

Robert F. Broussard, Houston, Tex., assignor, by mesne assignments, to Miller Meters, Inc., Chicago, Ill., a corporation of Illinois Original application January 14, 1948, Serial No. 2,263. Divided and this application August 18, 1952, Serial No. 306,782

5 Claims. (Cl. 133—8)

This invention relates to a coin-controlled apparatus, and especially to a coin-controlled apparatus such as a parking meter.

This application is a division of my copending application Serial No. 2,263 filed on January 14, 1948.

It is the general object of this invention to produce a new and improved coin-controlled apparatus.

It is a more specific object of this invention to provide in a coin-controlled apparatus a coin chute so constructed and arranged as to handle coins of different denominations and to retain a coin of each denomination at an intermediate portion of the chute until a subsequent coin of such denomination has been introduced thereinto.

One of the features of the invention is the provision in a coin-controlled apparatus of a coin chute for delivering coins to a storage receptacle provided with means for separating coins of different denomination into different paths of movement through the chute and to retain a coin introduced into the apparatus in position where it is visible until a subsequent coin of the same denomination is thereinto introduced.

A further feature of the invention is the provision of a counting mechanism for counting the coins introduced into the apparatus and operable to register in accordance with the denominational value of the coin.

While the invention of this application is primarily concerned with the mechanism for delivering a coin during its passage to a storage receptacle, the invention has been shown as incorporated in a parking meter; and for a better understanding of my invention and its adaptability for various uses, it is believed necessary to describe the mechanism of the parking meter with which it is herein shown as associated.

These and other objects and advantages may be realized from my invention, a suggestive embodiment whereof is illustrated in the accompanying drawings in the manner following:

The mechanism shown and described herein is one designed for operation in response to deposit of coins of either of two denominations—a penny and a nickel, for example. It will be convenient in describing the operation of the machine to refer to the larger of any two coins as "major" and to the smaller one as "minor," with the understanding that these terms designate any two coins which are made regularly in two different diameters. Also the unit of time for which the machine is designed will be referred to as one hour, as this is a convenient and common period of operation for parking meters. Again, it is to be understood that an hour is an arbitrary unit of time and may, in any given installation, be longer or shorter according to the time period for which the mechanism is designed to operate.

The operating mechanism is contained within a framework with which it forms a unitary structure capable of being installed within a suitable housing. Such a housing forms no part of this invention. The mechanism may be used with greatest advantage when installed within a housing having a removable head, but since this feature per se is not part of my invention, it is neither shown nor described.

The machine framework

Figures 3, 12, 13, 14:
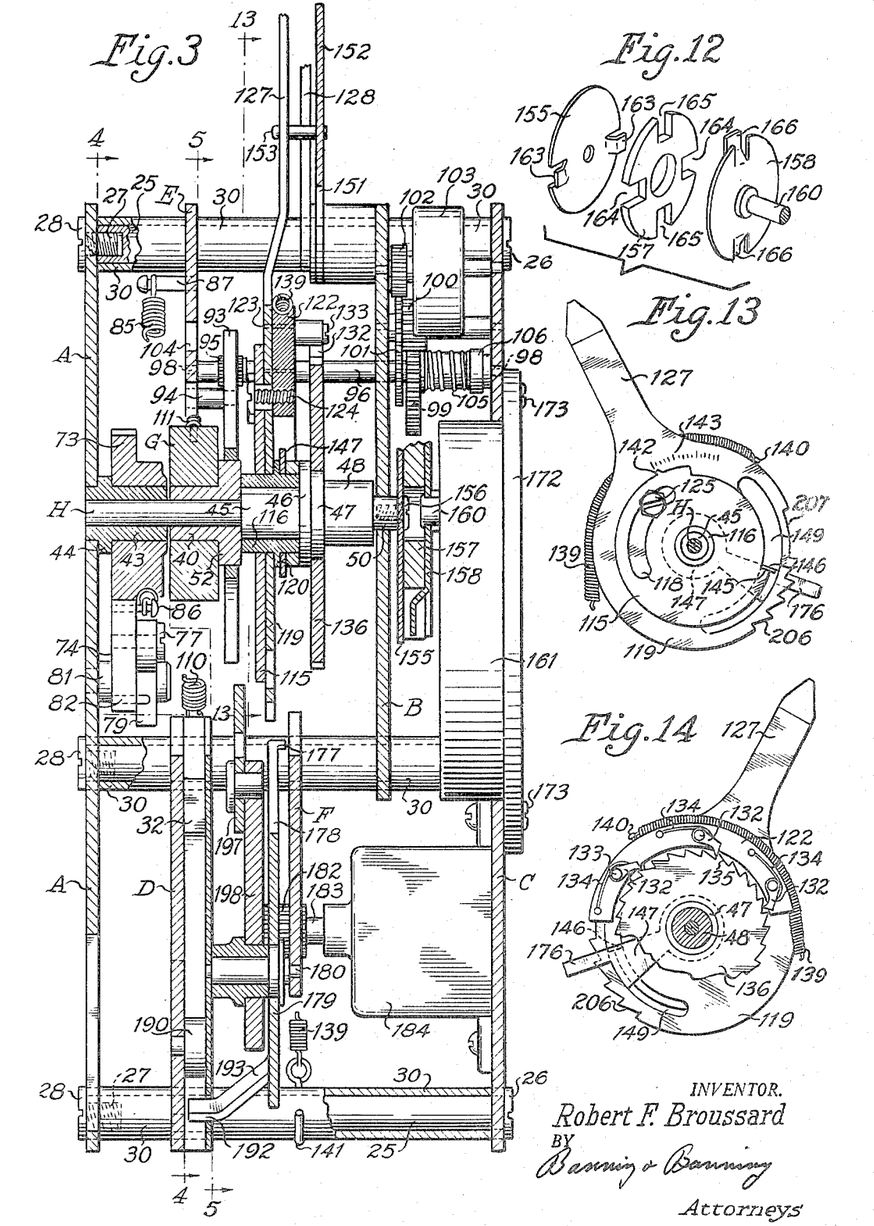
Fig. 3 is a central vertical section through the framework and the operating mechanism carried thereby, taken on line 3—3 of Fig. 4.
Fig. 12 is an exploded perspective view of the coupling which I employ for transmitting rotary motion from the main shaft to the governor.
Fig. 13 is a fragmentary detail in elevation, looking toward one side of the time control plate and indicator ratchet wheel, taken about on line 13—13 of Fig. 3.
Fig. 14 is a similar view, taken about on line 14—14 of Fig. 2.

The framework of the present mechanism comprises by preference a front plate A, a middle plate B, and a back plate C, each vertically disposed. These plates are interconnected by pillars at the tops and bottoms and also by intermediate pillars, the construction of all of them being desirably the same. As shown in Fig. 3, each pillar comprises a dowel pin 25 which extends through aligned openings in the several plates, the pin having a head 26 at one end and being formed at its opposite end with a threaded socket to receive the shank 27 of a screw whose head 28 engages the outer face of the front plate or back plate, as the case may be. Between the several plates traversed by each pin are spacer sleeves 30, each having the requisite length for spacing the middle plate the desired distance from the front and back plates. Other intermediate plates such as a chute plate D forming a closure for a chute wall 32, a stop plate E, and a bearing plate F are also traversed by one or more of the dowel pins, and in each such case additional spacer sleeves 30 of requisite length are used to maintain these intermediate plates spaced apart in fixed predetermined positions.

The front and back plates extend from top to bottom of the framework, the remaining plates being of lesser length. By the use of six pillars, two at the top, two at the bottom, and two others at intermediate points, all the vertical supporting plates of the framework are interconnected to provide a rigid structure.

The power mechanism

A novel feature of the parking meter shown is the power mechanism by which the time indicator is moved continuously through its movement cycle, say one hour. This mechanism comprises a primary power spring which is placed under tension in response to insertion of a coin into the machine. Pressure applied to the coin as it is introduced into the receiving slit is transmitted through certain operating parts to tension the power spring as an intermediate step in the setting of the time indicator. The word "tension" as used herein is relative, since the primary power spring remains always under tension to some extent; it refers rather to an increase of such tension to a point such that, when the stored energy is released, it will set the time indicator for a predetermined operating period and concurrently energize a secondary spring which functions to return the time indicator to the zero or starting position, subject to the restraint of a timing mechanism.

In any discussion of the power mechanism it is necessary to include a detailed description of the coin handling devices which will be considered at this point. The coin mechanism comprises an usher plate 33, desirably concave on both front and rear faces, and provided therethrough with a coin entry slit 34 (see Fig. 18) which is bounded by walls of substantial thickness to provide an adequate guide for a coin placed therein. The guide wall at the bottom of the entry slit is further slotted at 35 for a purpose which will later appear. Extending from the top of the usher plate are two ears 36 formed with registering holes for reception of the dowel pin 25 comprised in the pillar directly above. A duplex spring 37 is coiled around the pillar to engage at an intermediate point with the stop plate E therebetween, the opposite spring ends being engaged with the rear of the usher plate to maintain the latter yieldably in an outward position which is determined by engagement of a stop lug 38 carried thereby for limited movement within an opening 39 formed in the front plate A (see Figs. 1 and 19). Engagement of the stop lug 38 with the opposite end of the opening 39 also determines the innermost position of the usher plate.

The usher plate 33 stands immediately forwardly of a coin carrier G (see Figs. 15 and 16) which is mounted to rotate upon a sleeve 40 carried by the main shaft H of the machine. This shaft is surrounded at one end by a sleeve 43 having a shoulder 44 which abuts the inner face of the front plate A. The opposite end portion of the shaft, as shown, is built up to provide an enlarged cylinder 45 at one end of which is a flange 46 of increased diameter adjacent a shoulder 47 of lesser diameter which extends out from a second cylinder 48 whose end faces the proximate face of the middle plate B. Beyond this point the shaft continues at 50 through an opening in the middle plate which provides a bearing therefor. Such a longitudinal contour for the shaft is permissible, but obviously may be varied somewhat. The outer end of the sleeve 43 is journaled for rotation in the front plate A and the shaft H is also free to rotate within the sleeve bearing thus provided.

The sleeve 40 which adjoins the sleeve 43 is formed with a head 52 at its inner end adjacent the cylinder 45. The sleeve 40 is extended through an opening 54 near one end of the coin carrier G. At the opposite end of the coin carrier is a coin-receiving slot 55 which confronts the coin entry slit 34 in the usher plate 33, but in spaced relation thereto. Normally the usher plate stands away from the carrier (see Fig. 4), but in response to manual pressure accompanying passage of a coin through its slit 34 the plate advances much closer to the carrier so as to reduce the intervening gap. The guiding function of the walls which bound the slit 34 is important as the coin supported therein is thereby accurately positioned for transfer into the receiving slot 55 of the coin carrier.

At a point relatively close to the top of the framework is a shaft 57 (see Figs. 4, 9, and 10) carried between the front plate A and the stop plate E. This shaft furnishes a pivotal support for a segmental gear plate 58 and also for a primary power arm 59 which is arranged adjacent thereto with a laterally turned lug 60 engaging one edge thereof. The free end of the arm 59 is provided with a laterally turned finger 61 which normally lies in front of the receiving slot 55 in the coin carrier G. The wall of the coin carrier on one side of the coin-receiving slot 55 is channeled to provide a generally radial slot 62 (see Figs. 15 and 16) connecting with an arcuate lateral slot 63. The lateral finger 61 may advance into the radial slot 62 first inwardly and then angularly and outwardly through the lateral slot 63 so as to be clear of the coin carrier G when next operated (see Fig. 9). Movement is imparted to the primary power arm and thence to the finger 61 by a major or minor coin L or S, as the case may be, when inserted through the entry slit 34 of the usher plate 33 in the manner hereinafter to be described.

Upon the coin carrier wall opposite the one which is traversed by the radial slot 62 (see Fig. 15) is secured a coin selector hand 65 with the aid of a pivot screw 66. This hand sometimes hereinafter referred to as a coin gauge is provided with an inwardly turned finger 67 which traverses an arcuate slot 68 in the wall of the coin carrier so as to project within the coin receiving slot 55. In addition, the hand 65 is formed with an outwardly extended finger 69 adapted to be engaged by a part of the timing mechanism which will be described hereinafter at a later point.

Figure 18:
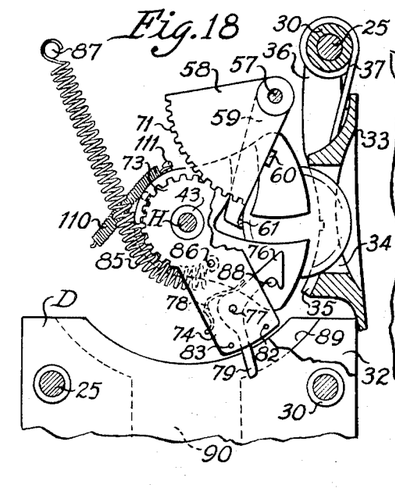
Fig. 18 is a detail in section, taken centrally through the coin usher plate, showing certain of the operating parts adjacent thereto.
Figure 19:
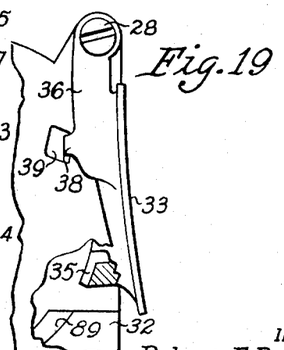
Fig. 19 is a detail, mostly in elevation, looking toward the framework front plate and the coin usher plate adjacent thereto.

The finger 61 on the primary power arm 59 stands behind the coin entry slit 34 of the usher plate so as to engage each coin as it is introduced into the machine (see Fig. 18). When this finger is retracted in response to pressure transmitted by the entering coin, the primary power arm 59 is swung back to oscillate with it the segmental gear plate 58 about its pivotal axis 57. The arcuate edge of the plate 58 is provided with gear teeth 71 in mesh with complementary gear teeth on the rounded end 73 of a secondary power arm 74 which is mounted for rotation freely about the sleeve 43 adjacent its shoulder 44. Normally the secondary power arm 74 depends downwardly and laterally in response to tension of a spring presently to be described. Near its free end the secondary power arm carries a latch 76 pivoted at 77 and acted upon by a spring 78 (see Fig. 18) to swing its tail end 79 normally against an adjustable screw 80 carried in a stationary post 81 (see Fig. 4). The latch tail is normally held in engagement with a stop pin 82 carried by the secondary power arm 74 from which it is free to swing through a limited arc toward a second stop pin 83 also mounted on the secondary power arm, but only when the latter has moved away from its normal inactive position shown in Fig. 4. The adjustable screw 80 which is extended transversely through the post 81 serves, by its engagement with the latch tail 79, to determine the stopping point for the secondary power arm 74 in one extreme position thereof; it also determines the rotative position at which the coin carrier is released for return to its normal position, as will later be explained.

A coiled spring 85 referred to herein as the primary power spring exerts its force through the secondary power arm to condition the timing mechanism for operation. One end of this spring is secured to the arm 74 at 86 for winding upon a hub thereof, and at its other end is connected to a post 87 which is affixed to the stop plate E (see Figs. 2 and 3). By such an arrangement the power spring 85 is wound upon the hub when the secondary power arm 74 is rotated counter-clockwise from the position of Fig. 4 to that of Fig. 18, so as to maintain the primary power arm 59 in an inner position where its finger 61 is positioned just rearwardly of the entry slit 34 in the coin usher plate 33.

When a coin, either major or minor, is pushed through the entry slit 34, the usher plate 33 may, in practice, be pushed inwardly with it. This is true always when a minor coin is advanced into the machine. In this advancing movement of the coin the primary power arm 59 will also be swung inwardly to clear the way for further coin movement into the receiving slot 55 of the coin carrier G (see Figs. 4 and 18). This inward movement of the primary power arm causes the secondary power arm 74 to swing oppositely, thereby stretching the primary power spring 85 to a condition of increased tension (see Figs. 6 and 18). The swinging movement of the secondary power arm continues to the point at which its latch 76 engages with a pin 88 which is extended laterally from the coin carrier G. Upon reaching this limit position the latch 76 will hook over the pin 88 so that, upon the return stroke, the coin carrier will also rotate with it, in a clockwise direction as viewed in Figs. 4–10, through about 90°, in response to tension of the primary power spring 85. In this operation the two power arms serve as a motion-transmitting connection from the actuating coin to the carrier in which it is received. The coin retained within the receiving slot 55 of the carrier G will be moved therewith and through the guide slot 35 into an aligned, downwardly inclined, arcuate track 89 through which it travels for gravity release into a vertical center chute 90 that is provided in the wall 32. The lower right hand side of this chute, as viewed in Fig. 4, terminates in a corner 91 below which it is widened for a purpose which will hereinafter appear.

Figure 17:
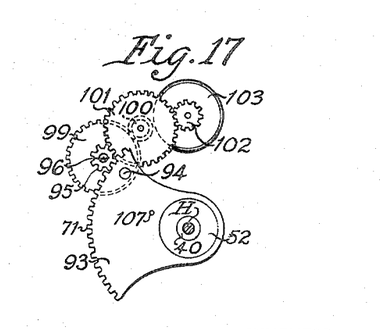
Fig. 17 is a view in elevation of the gear train leading to the flywheel.

Mounted fast on the head 52 of the sleeve 40 is a main fly gear 93. This gear meshes with the pinion 95 on a shaft 96 constituting part of a fly train. Opposite ends of this shaft are formed with trunnions 98 journaled within bearing openings in the stop plate E and back plate C. A fly train (see Fig. 17) comprising a gear 99 mounted on the shaft 96 is in train with other gears 100, 101, and 102 to drive a fly wheel 103. A light tension spring 105 is coiled around the shaft 96 at its end which is proximate to the back plate C. This spring bears with pressure at opposite ends against the gear 99 and also against a collar 106 which is fixedly carried on the fly train shaft 96 so as to act as a brake in preventing overrunning of the fly train.

Figure 5:
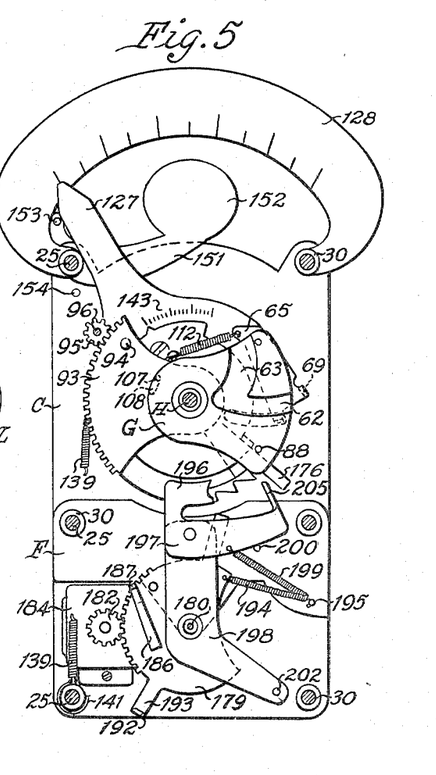
Fig. 5 is a similar view taken on line 5—5 of Fig. 3.
Figure 9:
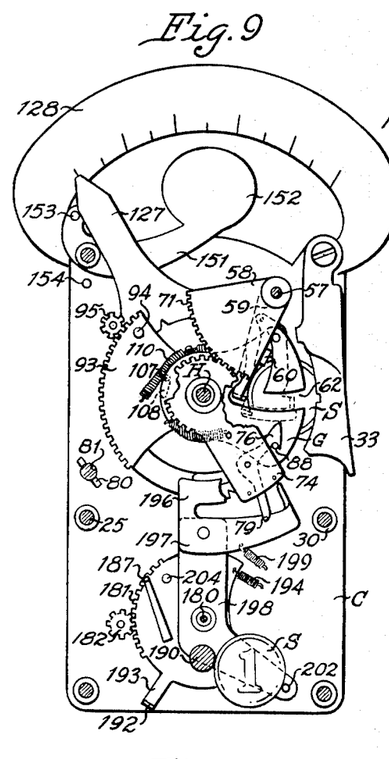
Figure 15:
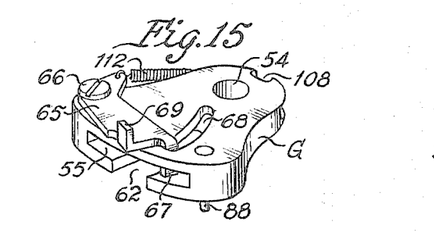
Fig. 15 is a detail in perspective of the coin carrier looking toward one side thereof.
Figure 16:
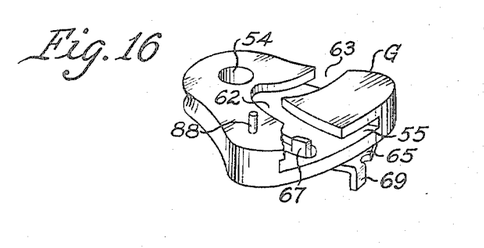
Fig. 16 is a similar view looking toward the opposite side of the coin carrier.

The main fly gear 93 which may be of segmental form is connected operatively with the coin carrier G by a pin 107 which is positioned within an elongated notch 108 formed in the carrier at its end proximate to the hole 54 (see Figs. 5, 9 and 15). Due to the length of the notch 108, the pin is free to move between its two ends, perhaps 10°, whereby a certain lost motion is attained. With each operation of the coin carrier the flywheel train is set in motion to oscillate between limits one of which is fixed by a stud 94 carried by the gear 93, when engaged with one end of an arcuate slot 104 in the plate E. This motion ends when the coin has reached its position of rest as will hereinafter be noted. The purpose of the fly wheel train is to control the speed of movement of the parts which are actuated by passage of the coin into the machine to its position of rest.

Operation of the primary and secondary power arms 59 and 74, respectively, results in the latch 76 hooking over the coin carrier pin 88, as already noted. At this point the secondary power arm 74 is ready to swing back to its normal position in response to tension exerted by the primary power spring 85. In this return movement the latch 76 rotates the coin carrier through a distance of about 90°, but against the light tension of a coiled return spring 110 which extends from an anchorage upon the chute wall 32 to wind upon the periphery of the carrier where it is secured by a pin 111. A second tension spring 112 is extended from the same pin 111 to an outset corner of the coin gauge 65, whereby the gauge is normally maintained in the position shown in Fig. 15 with its inturned finger 67 at the outer end of the arcuate slot 68.

Figure 4:
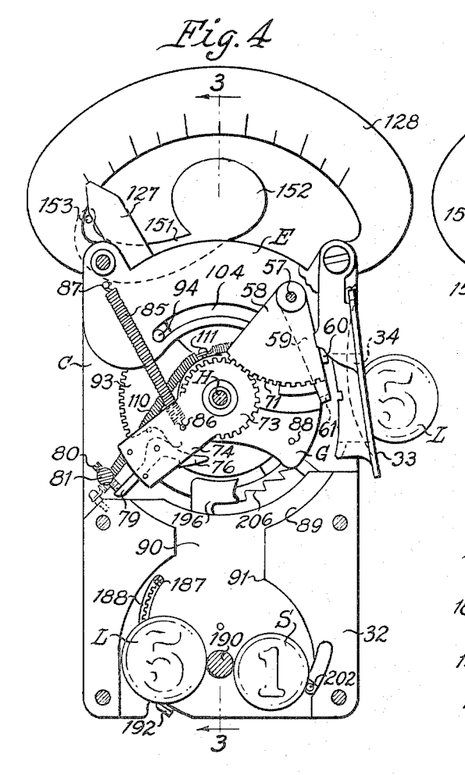
Fig. 4 is a vertical section through the operating mechanism, taken on line 4—4 of Fig. 3.
Figure 10:
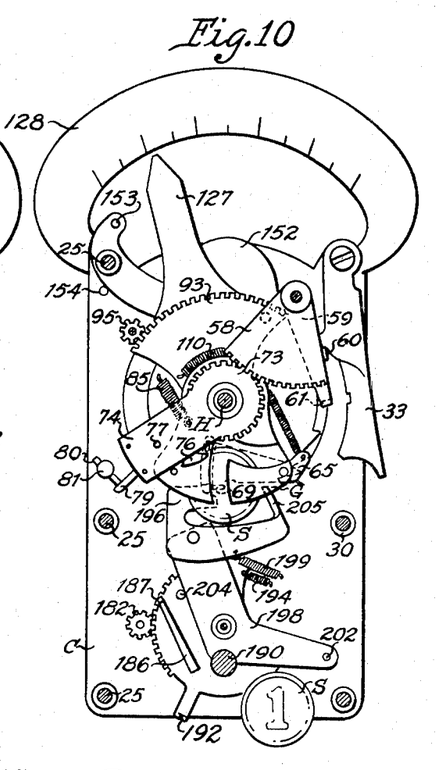

From the description up to this point it will be observed that from their normal positions shown in Figs. 4 and 10 the two power arms are swung oppositely to the positions of Figs. 9 and 18 where (a) the finger 61 has advanced close to the inner end of the coin carrier slot 62 and (b) the latch 76 has engaged the coin carrier pin 88, the primary power spring 85 being tensioned during this movement; and that from the advanced position where there is no longer any pressure on the coin, the primary power spring 85 then returns the two power arms to their original positions, but with the coin carrier executing a rotary movement due to pulling engagement of the latch 76 with the pin 88. The finger 61 does not impede this downward movement of the carrier since it then lies within the lateral slot 63 so as to emerge therefrom before the conclusion of the movement (see Fig. 7) to a position where it is free to swing outwardly to another position opposite the coin receiving slot 55 when the carrier has completed its cycle of movement (see Fig. 4). During the initial stroke of the power arms the spring 78 rocks the latch 76 so that its tail 79 approaches the stop 83 in preparation for hooking with the carrier pin 88; at the end of the return stroke (see Fig. 7) the latch is tripped by engagement of its tail with the adjustable stop 80, the coin carrier being thereby freed for return to its initial position in response to tension of its spring 110.

While the coin carrier is executing its downward movement, the spring-actuated coin gauge 65 maintains a pressure on the coin S or L, as the case may be, tending to hold the same within the track 89. The coin which is advanced downwardly through the track in response to a like movement of the carrier is freed for disengagement therefrom only when the coin has passed beyond the track end at the top of the center chute 90. At this point the coin enters the chute for gravity descent therethrough, but at the start of its down movement assistance is rendered by the spring 112 acting through the coin gauge 65. The coin thus transferred to the chute entrance is accordingly discharged with rapidity from the carrier at the end of its down movement whereby to remove interference for return of the carrier to its initial position in response to tension of the spring 110.

The timing mechanism

A generally circular time control plate 115 (see Figs. 13 and 14) is mounted for rotation upon a sleeve 116 which surrounds the shaft cylinder 45 (see Fig. 3). This plate is formed with an arcuate slot 118 concentric with the axis of the shaft H about which it is free to rotate. The time control plate lies adjacent an indicator ratchet wheel 119 which is mounted fast upon the sleeve 116 adjacent a collar 120 which extends outwardly therefrom. The indicator ratchet wheel 119 also carries on its side opposite the time control plate a segmental pulley 122 which may be secured thereto by suitable rivets or pins 123. A screw provided with a threaded shank 124 is secured to the ratchet wheel pulley, the screw shank extending through the ratchet wheel to lie within the arcuate slot 118 of the time control plate 115 whereby to lock one to the other and in so doing to limit the rotative movement of one relative to the other through a predetermined distance. The head 125 of the screw serves also to hold the time control plate 115 against separation from the indicator ratchet wheel 119.

Extending radially from the indicator ratchet wheel 119 is a finger 127 which rises to an upper position where it lies adjacent an arcuate dial plate 128 whose opposite ends are inturned and pierced to receive therethrough the dowel pins 25 comprised in the two top pillars of the framework. This dial plate extends through a distance of perhaps 60°, and the movement range of the indicator finger is such that it may traverse the full length of the dial which is desirably marked to indicate fractional periods of the hour when the mechanism is to operate for a period of that length. The top end of the indicator finger may be pointed and also attractively colored to enhance its distinctiveness.

Carried by the segmental pulley 122 is a plurality of pawls 132 each pivoted at 133 and receiving pressure from a spring 134 so that its acting end is maintained yieldably against the toothed periphery 135 of a ratchet wheel 136 which is mounted fast on the shaft shoulder 47. As shown, three such pawls are provided to reduce back lash to a negligible point and enhance their positive action with the ratchet wheel. A coiled indicator spring 139 of considerable length has one end connected at 140 to the pulley 122 and its other end fastened, as by a hook 141, to one of the lower pillars of the framework (see Fig. 5). The spring 139 is also a secondary spring because it receives its energization from the primary power spring, and will be sometimes hereinafter so referred to. By the means described, the indicator or secondary spring 139 will tend to move the segmental pulley rotatively in one direction, thereby imparting through the pawls 132 a like rotative movement to the ratchet wheel 136 to drive the shaft H. In this operation the indicator finger 127 is also moved through its prescribed arc across the dial plate 128 and the time markings thereon.

The extent of rotative movement of the indicator ratchet wheel 119 is determined by its rotative adjustment relative to the time control plate 115. A pointer 142 on the time control plate is positioned adjacent a set of calibrations 143 whereby to assist in the desired setting. As shown in Fig. 13, this pointer is opposite one end of the calibration marks, this being the position for operation of the indicator ratchet wheel 119 to swing the finger 127 fully across the dial, i. e., sixty minutes in a meter which is designed for one-hour operation. If the time is to be cut down, say to thirty minutes, then the time control plate 115 will be set to another position in which its pointer 142 will lie in a midway position lengthwise of the calibration marks.

At a position opposite the arcuate slot 118 the time control plate is formed with a radial shoulder 145 which lies in the path of a lug 146 that is laterally extended from a counter trip arm 147 which is operated only in response to passage of a major coin L. This counter trip arm is mounted for free rotation upon the sleeve 116 adjacent its collar 120. The lug 146 is free to move within an arcuate slot 149 formed in the indicator ratchet wheel 119. Manifestly by changing the position of the radial shoulder 145 through rotative adjustment of the time control plate 115, as already noted, the point of engagement of the lug 146 with the shoulder 145 may be changed and, by means hereinafter to be described, such an adjustment will affect the starting position of the indicator finger 127 and thereby determine the extent of its movement across the dial plate 128, or in other words the time period for which the meter will then operate.

The power mechanism communicates motion to the timing mechanism through the coin selector hand finger 69 which engages the lug 146 on the counter trip arm 147 which normally lies against the shoulder 145. The force of the primary power spring 85 is such as to overbalance that of the indicator or secondary spring 139, thereby causing the time control plate 115 to rotate clockwise from the position of Fig. 13. The distance of this movement is determined by the rotative adjustment of the ratchet wheel 119 relative to the control plate 115. There is accordingly provided a motion-transmitting means between the carrier and the indicator finger such that, in response to actuation by a coin, operation of the timing mechanism is initiated. It will be seen that the lug 146 which forms an integral part of the arm 147 is designed to be engaged by the finger 69 (Fig. 15) of the coin gauge 65 when the latter is rotated away from its normal position (Fig. 15) to an alternate position determined by the presence of a major coin in the coin carrier. When a minor coin is in the coin carrier, its smaller diameter is such as not to displace the coin gauge 65 sufficiently to bring the finger 69 into alignment with the lug 146. When the meter is operated by a minor coin the arm 147 is not rotated from its normal position. Deposit of a major coin L will assure operation for a one-hour period. If two such coins be deposited in succession, both will be registered in the counter which will presently be described, but the motorist will gain no benefit from the excess coin. If more than five minor coins be introduced in succession, the excess will also be registered by the counter, but will not accomplish anything beneficial for the motorist since movement of the indicator finger 127 is limited to 60 minutes as a maximum, as hereinbefore noted.

Figures 1, 2, 11:
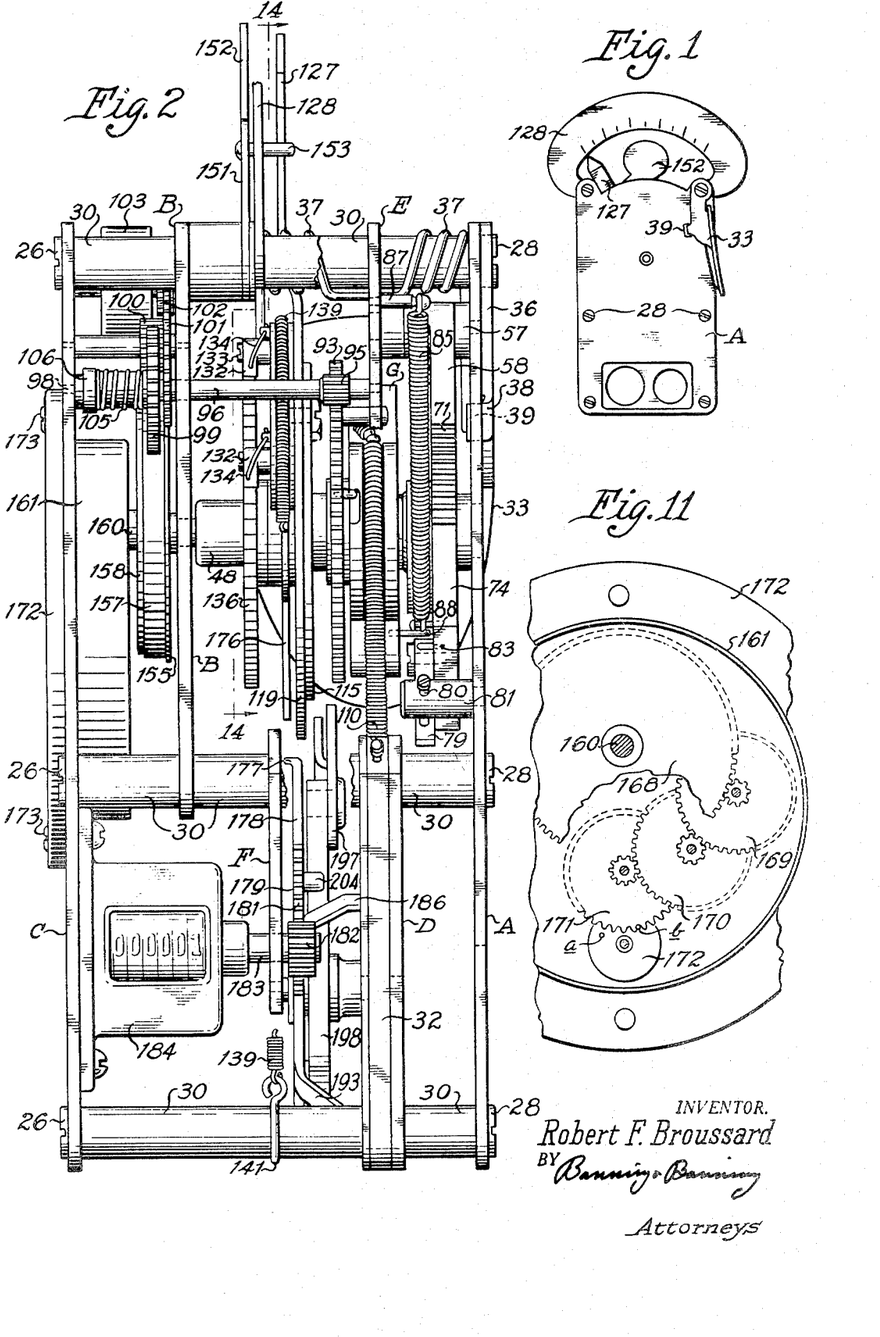
Figure 1 is a view in elevation of the front plate forming part of the framework for the operating mechanism.
Fig. 2 is an elevational view of one open side of the framework.
Fig. 11 is a detail, partly in elevation and partly in section, of the governor for controlling movement of the time indicator finger across the dial.

A signal arm 151 is pivotally mounted on the dowel pin 25 of one of the top pillars so as to display immediately below the dial plate 128 a flag 152 which may be colored or distinctively marked. The raised or display position of this flag is indicated in Figs. 1, 4 et al. The signal arm 151 is of bell crank form (see Fig. 10) in that it comprises an upwardly extending tail end that carries a lateral pin 153 which lies in the path of the indicator finger 127 as it approaches the zero position on the dial (see Fig. 4). Movements of the signal into and out of display position are controlled by the indicator finger, and nothing else. When the machine is first operated to advance the indicator finger to a predetermined position on the dial (depending upon the coin or coins deposited for the purpose) the indicator arm 127 will swing away from the pin 153 on the signal arm 151 to free the latter for gravity descent to a down position against a stop pin 154 where it remains relatively obscured (see Fig. 10). As the indicator finger approaches the end of its swinging movement across the dial, close to the zero position, it will re-engage the pin 153 at the tail end of the signal arm to produce a pivotal movement thereof along with the indicator finger, thereby raising the flag once more to exposed position where it is held until initiation of the next operating cycle of the machine.

At the end of the shaft H, one end of which is journaled in the middle plate B, is affixed a coupling comprising a mechanism plate 155 (see Figs. 3 and 12) which is secured fast on the shaft end as by an axial screw 156; and a center plate 157 and a brake plate 158, the latter carrying an axially extended stub shaft 160 which enters into a housing 161 wherein is accommodated a governor or brake mechanism. The mechanism plate 155 is provided at diametrically opposite points with lugs 163 offset into a common plane, each adapted to engage within a peripheral notch 164 which is formed oppositely in the center plate 157. In between the notches 164 are other similar notches 165 to receive lugs 166 lying in a common plane offset from the brake plate 158. Such a coupling is effective for transmitting rotary motion from the shaft H to the stub shaft 160, irrespective of whether or not the two shafts be perfectly aligned. This is a feature of advantage since it then becomes unimportant whether the two shafts be in exact axial alignment when the coupling is used for transmission of rotary motion to the brake mechanism which is contained within the housing 161.

Referring now to Fig. 11, the brake mechanism may comprise a gear 168 fast with the stub shaft 160, and in train with other gears 169, 170, and 171 each in mesh with a small pinion that is carried coaxially by the next gear in the train which ends with an oscillatable escapement wheel 172 having a pair of spaced pins *a* and *b* in coacting relation with the gear 171 whereby to control rotation thereof. By some such means as this I provide a controlled release for the power exerted by the spring 139 whereby to operate the timing mechanism continuously and accurately for the full cyclic period. The governor thus provided is a separate unit contained within the housing 161 which, as shown in Fig. 3, may be formed with a flange 172 adapted to rest against the outer face of the back plate C when received within an opening therethrough and secured releasably thereto as by means of screws 173.

Operation of the coin mechanism

A major coin L advanced by the carrier G into the center chute 90 will cause operation of certain mechanism whereas if it be a minor coin S certain other mechanism will be operated. The ensuing description will deal first with operation induced by a major coin and later with the operation that is induced by a minor coin.

*First, the major coin operation.*—As the coin carrier swings downwardly to advance a major coin L on its way, the counter trip arm 147 for the major coin undergoes a corresponding motion. From this arm is extended a hand 176 (see Fig. 14) adapted to engage a finger 177 which is laterally turned from an arm 178 which is projected outwardly from a release-trip in the form of a disc 179 mounted to rotate about a pivot 180 (see Fig. 6). The periphery of this disc is formed with teeth 181 extending through a desired distance for engagement with a pinion 182 that is affixed to the operating shaft 183 of a counter mechanism 184.

The release-trip disc 179 carries a fixed arm 186 having a laterally turned finger 187 which is movable through an arcuate slot 188 provided in the chute wall 32 (see Fig. 4). In the normal position of rest, this finger 187 lies near the top of the arcuate slot 188 spaced away (see Fig. 4) a maximum distance from a medially positioned abutment 190 which extends into the chute from the plate D at a point below the center from which the arcuate slot 188 is described. An entering coin is free to fall between the finger 187 and the abutment 190 to rest against a finger-stop 192 which is extended laterally from a third arm 193 projecting outwardly from the release-trip disc 179 (see Fig. 7). In normal operation of the machine there will usually be a coin resting near the bottom on the finger 192 which constitutes a retractable stop, so that a succeeding coin deposited in the machine for its next operation may be utilized to effect a discharge into a coin box (not shown) of the previously placed coin.

Figure 6:
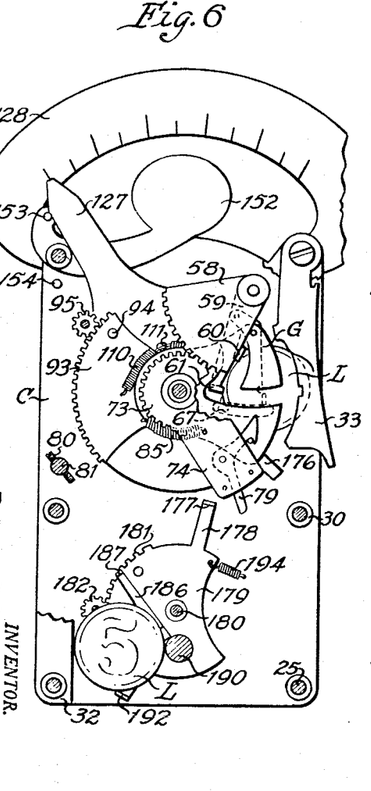
Figs. 6–10, which are sectional views taken in the plane of line 4—4 of Fig. 3, show the operating mechanism in five successive stages of its cycle.
Figure 7:
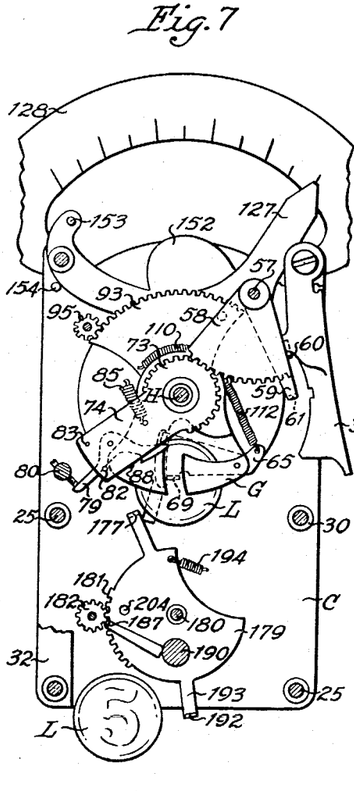
Figure 8:
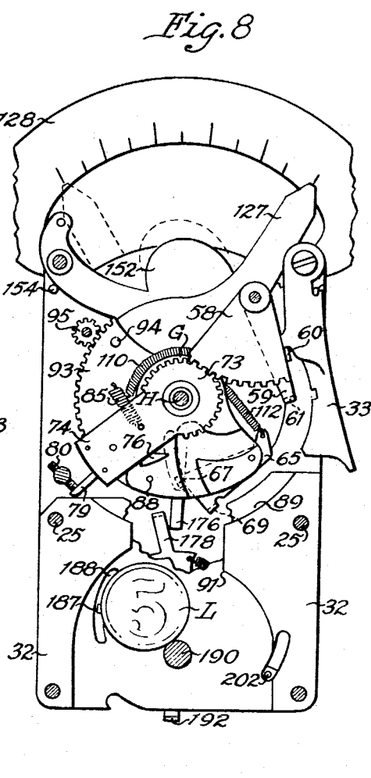

If the machine be clear, the first major coin deposited therein will pass into the vertical chute 90 where it initially encounters the release-trip disc 179 then positioned somewhat as shown in Fig. 8. The space between the finger 187 and the abutment 190 is momentarily insufficient for the coin to pass therebetween. In the succeeding stages of movement of the release-trip disc 179 the position of Fig. 6 will first be reached where the coin is released to drop down the short distance required to engage and be held by the finger-stop 192 when moved to the left. In a subsequent operation the release-trip disc is oppositely moved to swing the holding finger-stop 192 to the right (see Fig. 7) whereby to release the coin for gravity descent into the money box (not shown). After this takes place, the release-trip disc will again be rotated back to its normal position, whereupon the distance of separation between the finger 187 and the abutment 190 is enlarged sufficiently to permit the next succeeding coin to drop down to a position of rest against the finger-stop 192, as shown in Figs. 4 and 6.

A major coin L descending through the center chute 90 will be required to move to the left, as viewed in Fig. 4. It cannot move to the right because of insufficient space between the corner 91 and the medial abutment 190 therebelow. Nor will it be possible for a major coin to lodge on the abutment 190 and rest against the corner 91 because in that position the center of gravity of the coin lies to the left of a line vertically of the abutment. Such a coin will always tend, therefore, to fall to the left and operation of the counter 184 will then ensue in the manner hereinbefore described.

The purpose served by the mechanism just described is that of a controlled release for major coins introduced successively into the machine, whereby each coin freshly entering is prevented from traveling immediately to its final position of rest until after the preceding coin has been released for gravity discharge into the money box. A spring 194 attached to the disc 179 and at its opposite end to an anchor 195 on the bearing plate F provides a means for automatically returning the release-trip disc to its initial position after each succeeding major coin has completed its passage through the machine. Each time a coin passes through the controlled release, the pinion 182 is oscillated a predetermined distance to operate the counter 184 which thereupon registers the passage of the major coin.

Figures 20, 21:
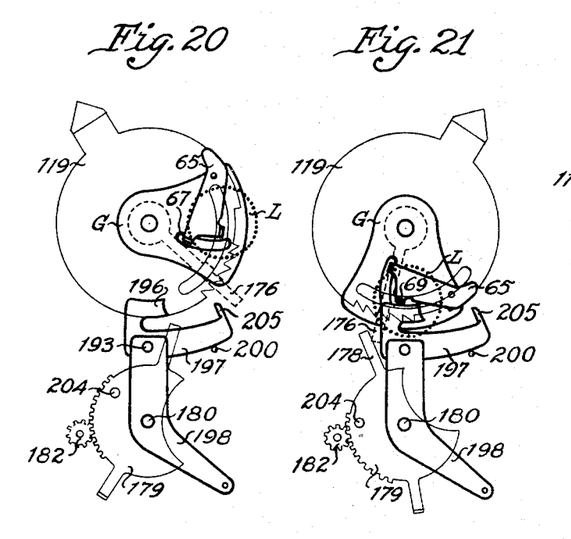
Figs. 20 and 21 are somewhat diagrammatic views showing in elevation the coin carrier and associated parts in two successive positions during operation in response to a major coin.

During operation of the mechanism just described the major coin engages with the finger 67 to hold the coin gauge 65 in a fully inwardly swung position (see Fig. 20) while the coin carrier G is rotated. The coin diameter is such that it will remain protruded slightly from the carrier so as to ride in the arcuate track 89. The outwardly extended finger 69 of the coin gauge remains positioned at a point inwardly of a head 196 of a dog 197 (see Fig. 21) which is pivotally supported at 193 upon one end of an angle arm 198 that is mounted upon the pivot 180 for rocking movement thereupon. This dog is biased by a coiled spring 199 connected thereto and to the anchor 195 so that it normally engages with a stop pin 200, under which condition the dog head 196 is positioned out of the path of the finger 69. Since the major coin assures that there will be no engagement of the finger 69 with the dog head 196, the latter undergoes no movement during this operation. But, as already described, the finger 69 does engage with the lug 146 during this movement, thereby rotating the time control plate 115 and indicator ratchet wheel 119 to initiate operation of the timing mechanism.

Figure 22:
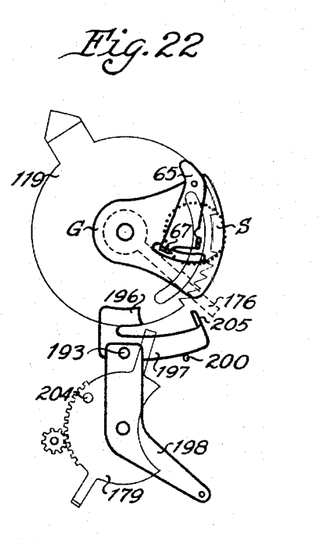
Figs. 22–24 are similar views showing three successive positions during operation in response to a minor coin.
Figures 23, 24:
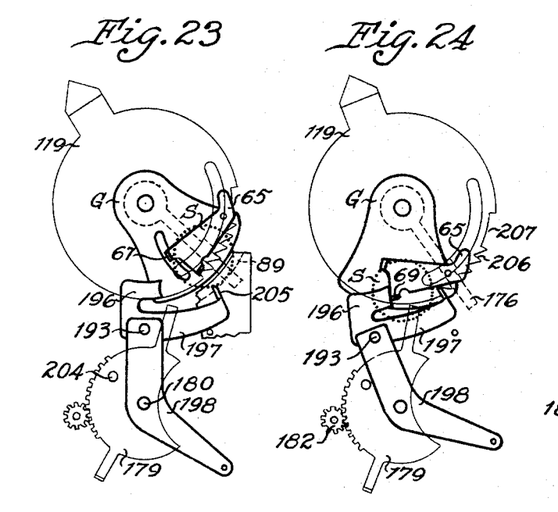

*Now, the minor coin operation.*—When a minor coin S is pushed to its limit within the receiving slot 55 of the coin carrier, it will occupy the fully-inserted position shown in Fig. 22. Here it will be noted the coin gauge 65 has initially been swung inwardly to its limit so as to position its finger 67 near the inner end of the arcuate slot 68. At this point the carrier starts its clockwise rotation, but since there is then no further pressure directed inwardly on the coin the latter, in response to pressure of the spring 112 exerted through the coin gauge 65, will be moved very slightly outwardly from the receiving slot 55 to ride within the arcuate track 89 (see Fig. 23). The minor coin diameter, however, is such that it permits outward swinging movement of the coin gauge 65 to a point where its finger 69 lies opposite the head 196 of the dog 197 at the conclusion of clockwise rotation of the carrier (see Fig. 24). The result is an engagement of the head 196, producing a tilting of the dog head 197 and also a rocking movement of its supporting angle arm 198 against the tension of the spring 199.

The angle arm lower end carries a stop pin 202 whose distance from the abutment 190 is increased when the angle arm is rocked in response to engagement of the dog head 196 by the finger 69 (see Fig. 10). At such times only is the clearance between the stop pin 202 and the abutment 190 sufficient for a minor coin to pass therebetween. Normally a minor coin will be held at this point (see Fig. 9), awaiting passage of a succeeding minor coin to operate the coin gauge 65 to the requisite position for tripping the angle arm 198.

When the dog 197 is rocked, a pawl 205 at one end thereof is raised into engagement with the proximate one of five ratchet teeth 206 on the periphery of the indicator ratchet wheel 119. A short rotary movement of predetermined distance is thereby imparted to the ratchet wheel as the result of operation of the coin carrier with a minor coin contained therein. This short rotary movement of the ratchet wheel takes place just before the coin carrier completes its clockwise movement. The result is the indicator finger 127 is swung across the dial to the 12-minute position, or whatever point on the dial is reached in response to this movement which originates with rocking of the angle arm 198. From this position of advance the indicator finger starts its return movement under the impetus of the secondary spring 139, subject to the restraint imposed by the brake mechanism within the housing 161. If at about the same time another minor coin be inserted into the machine, the ratchet wheel 119 will be further rotated through another like distance in response to engagement of the pawl 205 with its next adjacent ratchet tooth 206. The second operation following close upon the first has the effect of moving the indicator finger 127 further across the dial through an additional distance correponding to 12 minutes, i. e. to the 24-minute position. For an operating cycle of one hour, I provide five ratchet teeth 206 adapted to be successively engaged by the pawl 205 in response to deposit of five minor coins one closely upon another. Since each coin will cause the indicator finger 127 to advance a distance of 12 minutes across the dial, the result is a total advance of one hour when five such coins are inserted in close succession. Beyond the fifth ratchet tooth 206 there is an elongated peripheral notch 207 within which the pawl 205 may freely move. Accordingly, if more than five minor coins be introduced into the machine in succession, the extreme advanced position of the indicator finger 127 will be 60 minutes since no motion can be transmitted to it beyond that point. By this means injury to the parts is avoided in case anyone chooses to deposit coins in excess of the number required for advance of the indicator finger to its limit position.

Whenever a minor coin S falls through the center chute 90, it will strike a major coin L already lodged to the left and held in the position indicated in Fig. 4. Such a striking of one coin with the other will deflect the minor coin S to the right so as to operate the counter in the manner already described. Should the machine be entirely clear of coins, then if a minor coin be introduced it may pass to either right or left of the abutment 190, but without any damage to the machine, its discharge from the position where it is halted taking place as an incident to the next succeeding operation of the machine.

When a major coin L passes through the center chute 90, the release-trip disc 179 is moved five times the distance that it is rotated when a coin S of minor denomination passes through. The counter is accordingly operated through the requisite distance according to the denomination of the actuating coin whereby to register properly the value of the coin so passing through the machine. Operation with a minor coin S is effective to rock the angle arm 198 only very slightly, yet enough to cause it to engage a pin 204 whereby to oscillate the disc 179 counter-clockwise to produce a corresponding movement of the counter 184. This same movement also retracts the stop pin 202 from the abutment a sufficient distance to release the minor coin restrained thereby for discharge from the chute; this movement is not enough, however, to release a coin L of major denomination that may then be resting on the finger 192.

Figure 25:
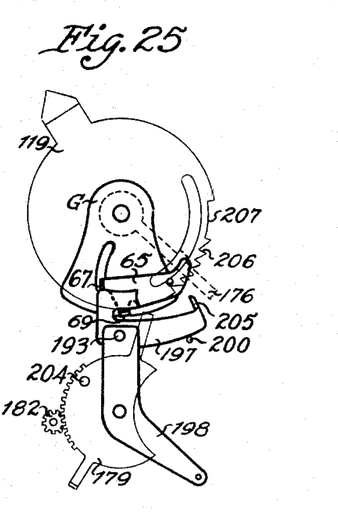
Fig. 25, which is a similar view, shows the parts associated with the coin carrier in a neutral position as when attempt is made to operate with no coin or with one which is smaller than the minor coin for which the mechanism is designed.

Should an effort be made to operate the machine without a coin, as by inserting a tool through the slit 34 to press the primary power arm 59 inwardly, nothing will come of such an attempt. While the power mechanism may be set in motion without a coin in the carrier G, the coin gauge 65 cannot, in the absence of a coin within the carrier, be held in an effective inward position, consequently its finger 69 will pass idly below the dog head 196 into the slot therebelow (see Fig. 25) and accomplish nothing.

While this invention is susceptible of embodiments in many different forms, there is shown in the drawings and is herein described in detail one specific embodiment, with the understanding that the present disclosure is to be considered as an exemplification of the principles of the invention and is not intended to limit the invention to the embodiment illustrated. The scope of the invention will be pointed out in the appended claims.

I claim:

1. In a parking meter, a coin-operated mechanism operable to receive major and minor coins and movable to deliver such coins to a chute through which said major and minor coins may descend, a medial abutment within the chute, means within the chute above the abutment to one side thereof and spaced therefrom a distance sufficiently short to prevent passage therebetween of a major coin while permitting a minor coin to pass therethrough, separate means on opposite sides of the abutment displaceable from a coin-arresting position by operation of the coin mechanism to a second position permitting descent of a coin past the displaceable means, a counter for registering the passage of each coin, and motion-transmitting means connecting the coin mechanism with the counter for operation thereof in response to movement of the coin mechanism, said motion transmitting means transmitting to the counter movement proportional to the diameter of the coin received by the coin mechanism.

2. The combination in a coin-controlled device, of a first gravity coin chute proportioned to pass both major and minor coins, a second gravity coin chute extending downwardly from and communicating with the first chute and proportioned to pass minor coins received from the first chute but not major coins, a third gravity coin chute extending downwardly from and communicating with the first chute and proportioned to pass major coins, said second and third chutes both opening at their lower ends into a common passage, an abutment below the first chute so positioned laterally of the first chute that a major coin cannot remain at rest thereon but, upon encountering the same, will fall therefrom into said third chute, a movable element normally effective to retain a major coin in a position such that when a minor coin descends through the first chute it is deflectable by a major coin, so retained, into the second chute, and means operative incidentally to passage of a succeeding major coin through the first chute to move said element and thus release the first-mentioned major coin.

3. The combination in a coin-controlled device, of a first gravity coin chute proportioned to pass both major and minor coins, a second gravity coin chute extending downwardly from and communicating with the first chute and proportioned to pass minor coins received from the first chute but not major coins, a third gravity coin chute extending downwardly from and communicating with the first chute and proportioned to pass major coins, said second and third chutes both opening at their lower ends into a common passage, coin delivery means movable to deliver major and minor coins for gravity movement through said first chute, an abutment below the first chute so positioned laterally of the first chute that a major coin cannot rest thereon but, upon encountering the same, will fall into said third chute, a first coin retaining means positioned in said third chute for movement between coin-retaining and non-retaining positions, a second coin retaining means positioned in said third chute below said first retaining means for movement between coin-retaining and non-retaining positions, means normally maintaining the first retaining means in non-retaining position and maintaining the second retaining means in coin-retaining position so that a major coin retained by said second retaining means will deflect a minor coin descending through said first chute into the second chute, and means connecting the coin delivery means to each of said retaining means and operable to move the first retaining means to coin-retaining position and the second retaining means to non-retaining position upon movement of the coin delivery means to deliver a coin to said chute.

4. The combination in a coin-controlled device, of a first gravity coin chute proportioned to pass both major and minor coins, a second gravity coin chute extending downwardly from and communicating with the first chute and proportioned to pass minor coins received from the first chute but not major coins, a third gravity coin chute extending downwardly from and communicating with the first chute and proportioned to pass major coins, said second and third chutes both opening at their lower ends into a common passage, coin delivery means movable to deliver major and minor coins for gravity movement through said first chute, and abutment below the first chute so positioned laterally of the first chute that a major coin cannot remain at rest thereon but, upon encountering the same, will fall into said third chute, a rotatable member, a first coin-retaining means carried by the member and positioned in said third chute, a second coin-retaining means carried by the member and positioned in said third chute below the first retaining means, means normally urging the member to a rotative position in which the first retaining means is ineffective to retain a coin in the third chute and the second retaining means is effective to retain a coin in said third chute, a third coin-retaining means in the second chute and movable between coin-retaining and non-retaining positions, means normally urging the third retaining means to coin-retaining position, means operated by movement of the coin delivery means to deliver a major coin to the first chute to rotate the member to render the first retaining means effective to retain a coin in the third chute and to render the second retaining means ineffective to retain a coin, whereby to release a coin retained by said second retaining means, and means operated by movement of the coin delivery means to deliver a minor coin to said first coin chute to move the third retaining means to non-retaining position to release a coin retained therein.

5. The combination in a coin-controlled device, of a first gravity coin chute proportioned to pass both major and minor coins, a second gravity coin chute extending downwardly from and communicating with the first chute and proportioned to pass minor coins received from the first chute but not major coins, a third gravity coin chute extending downwardly from and communicating with the first chute and proportioned to pass major coins, said second and third chutes both opening at their lower ends into a common passage, coin delivery means movable to deliver major and minor coins for gravity movement through said first chute, an abutment below the first chute so positioned laterally of the first chute that a major coin cannot remain at rest thereon but, upon encountering the same, will fall into said third chute, a rotatable member, a first coin-retaining means carried by the member and positioned in said third chute, a second coin-retaining means carried by the member and positioned in said third chute below the first retaining means, means normally urging the member to a rotative position in which the first retaining means is ineffective to retain a coin in the third chute and the second retaining means is effective to retain a coin in said third chute in position to deflect a minor coin descending through said first chute into the second chute, a third coin-retaining means in the second chute and movable between coin-retaining and non-retaining positions, means normally urging the third retaining means to coin-retaining position, means operated by movement of the coin delivery means to deliver a major coin to the first chute to rotate the member to render the first retaining means effective to retain a coin in the third chute and to render the second retaining means ineffective to retain a coin, whereby to release a coin retained by said second retaining means, means operated by movement of the coin delivery means to deliver a minor coin to said first coin chute to move the third retaining means to non-retaining position to release a coin retained therein, a counter mechanism connected to said member for operation thereby as the member is rotated, and means connecting the third release means to the member to rotate the member upon operation of said third release means.

References Cited in the file of this patent

UNITED STATES PATENTS

| | | |
|---|---|---|
| 728,309 | Scribner | May 19, 1903 |
| 830,654 | Dyson | Sept. 11, 1906 |
| 1,063,589 | Potter | June 3, 1913 |
| 1,143,357 | Buchanan | June 15, 1915 |
| 1,395,676 | Hughes | Nov. 1, 1921 |
| 2,218,821 | Jennings | Oct. 22, 1940 |
| 2,307,999 | Eidmann | Jan. 12, 1943 |
| 2,329,926 | Michaels | Sept. 12, 1943 |
| 2,429,478 | Michaels | Oct. 21, 1947 |

FOREIGN PATENTS

| | | |
|---|---|---|
| 479,535 | Germany | July 18, 1929 |